United States Patent [19]

Sakai

[11] Patent Number: 4,751,445

[45] Date of Patent: Jun. 14, 1988

[54] STEPPING MOTOR CONTROL DEVICE

[75] Inventor: Shinji Sakai, Kanagawa, Japan

[73] Assignee: Canon Kabushiki Kaisha

[21] Appl. No.: 7,134

[22] Filed: Jan. 22, 1987

Related U.S. Application Data

[63] Continuation of Ser. No. 729,291, May 1, 1985, abandoned.

[30] Foreign Application Priority Data

May 8, 1984 [JP] Japan .................................. 59-91465

[51] Int. Cl.[4] .............................................. H02P 8/00
[52] U.S. Cl. .................................... 318/696; 318/685;
354/452
[58] Field of Search ................ 318/696, 685; 354/452,
354/402, 439

[56] References Cited

U.S. PATENT DOCUMENTS

| 4,005,448 | 1/1977 | Iwata et al. | 354/439 |
| 4,297,625 | 10/1981 | Newell | 318/696 |
| 4,299,459 | 11/1981 | Mizokami | 354/452 |
| 4,344,678 | 8/1982 | Mizokami | 354/452 |
| 4,432,620 | 2/1984 | Kurokawa | 354/402 |
| 4,443,746 | 4/1984 | Arakin | 318/685 X |

FOREIGN PATENT DOCUMENTS

58-90625  5/1983  Japan .

Primary Examiner—William M. Shoop, Jr.
Assistant Examiner—M. Bergmann
Attorney, Agent, or Firm—Toren, McGeady & Associates

[57] ABSTRACT

A stepping motor control device is provided with a current control circuit by which the levels of currents of different driving power sources arranged to drive a stepping motor are virtually continuously changed, so that the motor can be controlled at intermediate phases thereof.

24 Claims, 10 Drawing Sheets

| LOWER 3 BITS OF COUNTER 10 | | | OUTPUT OF DECODER 11 | | | |
|---|---|---|---|---|---|---|
| 4 | 2 | 1 | S1 | S2 | S3 | S4 |
| 0 | 0 | 0 | 0 | 0 | H | 0 |
| 0 | 0 | H | 0 | H | H | 0 |
| 0 | H | 0 | 0 | H | 0 | 0 |
| 0 | H | H | 0 | H | 0 | H |
| H | 0 | 0 | 0 | 0 | 0 | H |
| H | 0 | H | H | 0 | 0 | H |
| H | H | 0 | H | 0 | 0 | 0 |
| H | H | H | H | 0 | H | 0 |

FIG.7

| 200C | 200A' | 200B | DUTY1 | DUTY0 |
|---|---|---|---|---|
| H | — | — | L | L |
| L | H | — | H | H |
| | L | H | Q2 | Q1 |
| | | L | Q4 | Q3 |

STEPPING MOTOR CONTROL DEVICE

This is a continuation of application Ser. No. 729,291 now abandoned 1/23/87 filed May 1, 1985.

BACKGROUND OF THE INVENTION

1. Field of the Invention

The invention relates to a stepping motor control device arranged to control a stepping motor which serves as a drive source. 2. Description of the Prior Art Heretofore, there has been proposed a method for driving, for example, a diaphragm by means of a stepping motor which is arranged in a ring-like shape. However, this prior art method has presented various problems including (a) a large electric energy is necessary for keeping the diaphragm aperture at a predetermined value even while the aperture is not shifted and (b) the aperture cannot be smoothly shifted.

SUMMARY OF THE INVENTION

A general object of this invention is to solve the above-stated problems of the prior art method by virtually continuously changing currents supplied to a stepping motor for driving it.

It is a more specific object of this invention to provide a motor control device which gives a great electric energy saving effect.

It is another object of this invention to provide a stepping motor control device which smoothens the driving operation of the stepping motor.

To attain the above-stated object, an embodiment of this invention is arranged to apply currents which have at least three stepwise effective levels to coils for driving the stepping motor. In accordance with the arrangement of the embodiment, currents having a plurality of phases for the stepping motor are effectively increased or decreased so that the consumption of electric energy can be saved when the motor is not operated and that the motor can be smoothly moved.

Further, with the exposure effecting operation of an image sensing apparatus controlled by the above-stated motor, the luminance of the image plane never suddenly changes so that the operation and performance of the image sensing apparatus can be improved.

These and further objects and features of the invention will become apparent from the following detailed description of preferred embodiments thereof taken in connection with the accompanying drawings.

DETAILED DESCRIPTION OF THE PREFERRED EMBODIMENTS

Figure 1:
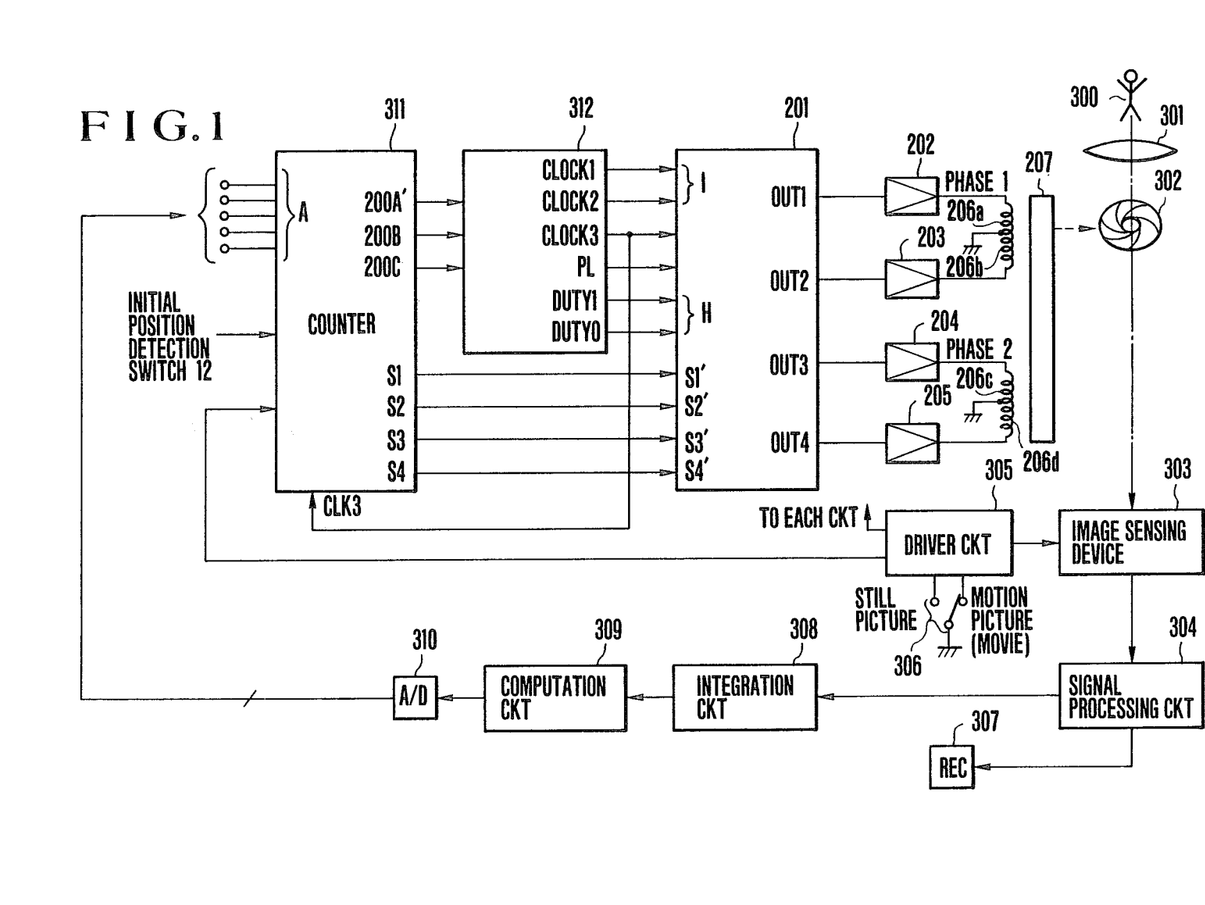
FIG. 1 is a diagram showing the arrangement of an image sensing apparatus embodying this invention.
Figure 2:
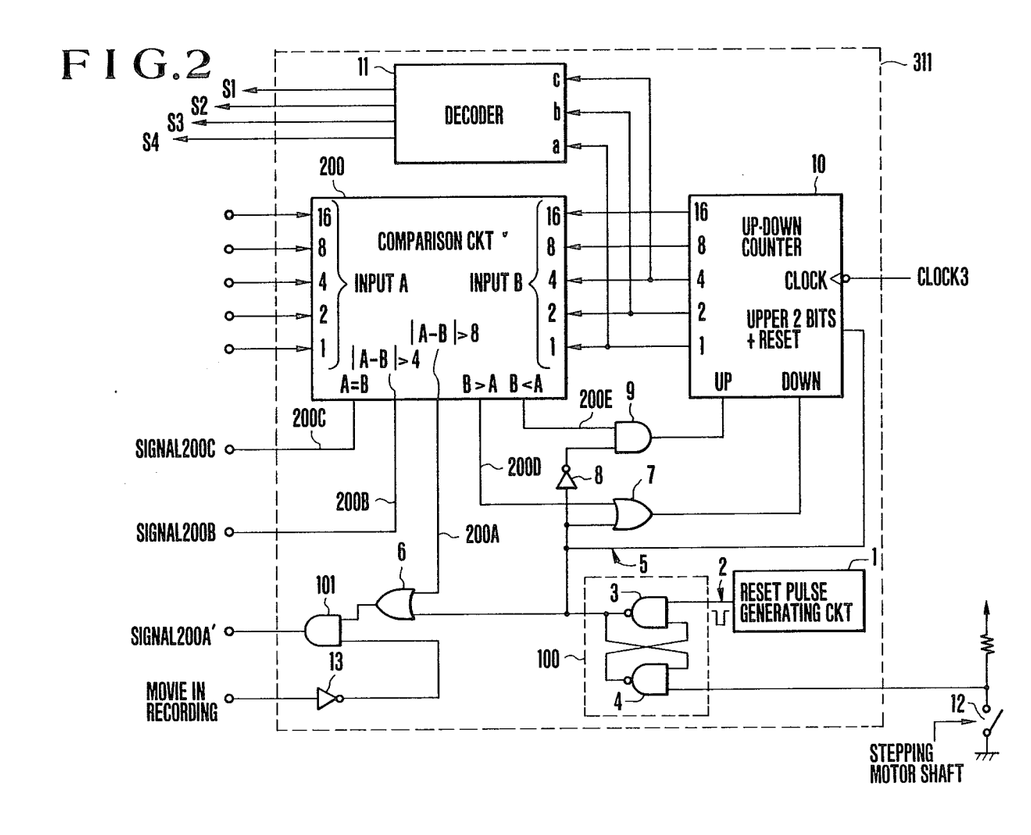
FIG. 2 is a diagram showing by way of example the arrangement of a counter block included in the apparatus shown in FIG. 1.

FIG. 1 shows the arrangement of an image sensing apparatus provided with a stepping motor control circuit embodying this invention as an embodiment thereof. The illustration includes an object 300 to be photographed; an optical system 301; an iris diaphragm 302 arranged as exposure control means; an image sensing device 303 arranged to serve as light receiving means, photo-electric conversion means and image sensing means; a signal processing circuit 304 arranged to convert the output of the image sensing device 303 into a signal suited for recording by a recorder 307; a driver ciruict 305 arranged to drive the image sensing device 303, etc; and a change-over switch 306 which is arranged as selection means for switch-over between a still picture recording mode and a motion picture recording mode. With this switch shifted to a still picture position, one picture portion of a picture signal is recorded on the recorder. With the switch 306 set in a motion picture position, the picture signal is continuously recorded. Further, with this switch 306 set in the motion picture position thereof, a high level signal is supplied to an inverter which is shown in FIG. 2. An integration circuit 308 is arranged to integrate at a predetermined frequency or time constant a signal, such as a luminance signal, which is formed by the signal processing circuit 304. A computation circuit 309 is arranged to compute an adequate aperture value according to the output of the integration circuit 308. An A/D (analog-to-digital) converter 310 is arranged to convert an analog computed value obtained from the computation circuit 309 into a digital value. These circuits 308-310 jointly form means for designating a displacement target for the motor.

The apparatus further comprises a counter block 311; a clock pulse generating circuit 312 a duty control circuit 201 which serves as control means for controlling the effective levels of currents to be applied to coils 206a–206d at least in three steps; buffer amplifiers 202–205; and a rotor magnet arranged to serve as displacement means.

Figure 3:
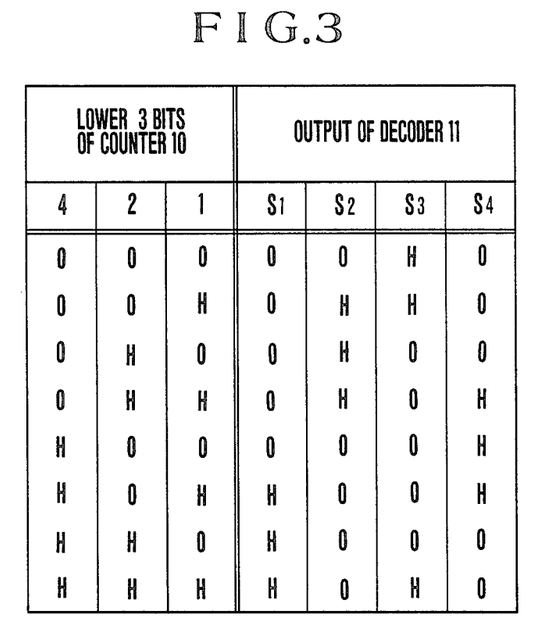
FIG. 3 is a chart showing a condition of a decoder 11 of FIG. 2.
Figure 4:
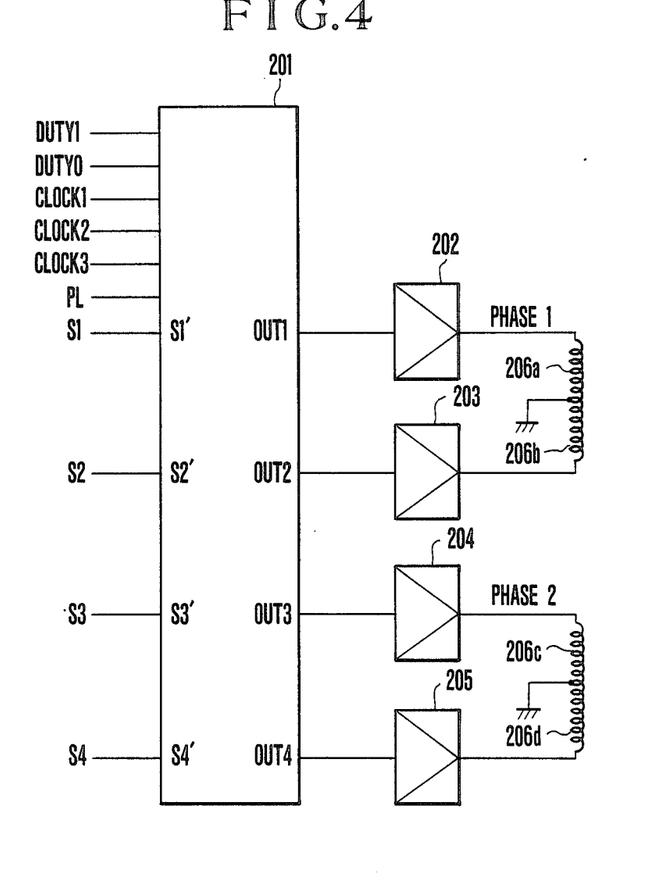
FIG. 4 is a schematic diagram showing the arrangement of a motor driving circuit and a duty control circuit.
Figure 5:
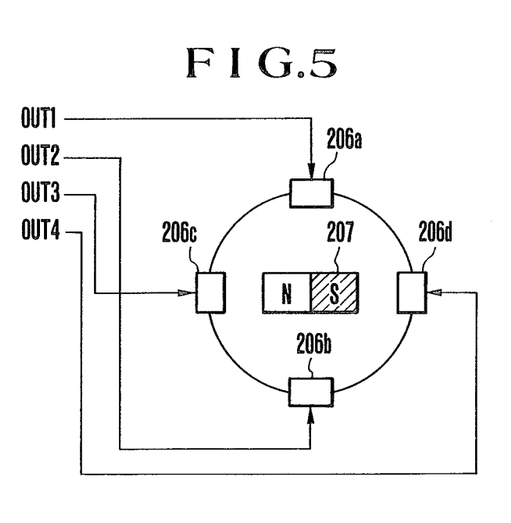
FIG. 5 is a schematic diagram showing the inside arrangement of a motor.

The details of arrangement of the counter block 311 are as shown in FIG. 2. When a power supply is turned on, a known reset pulse generating circuit 1 (a power-up-clear circuit) produces a negative reset pulse 2 for initialization. This resets an RS flip-flop 100 which consists of NAND gates 3 and 4. The output 5 of the RS flip-flop 100 becomes a high level. As a result, the output level of an OR gate 6 becomes a high level. Meanwhile, an OR gate 7, an inverter 8 and an AND gate 9 bring an up-down counter 10 into a down counting mode. Accordingly, the up-down counter 10 repeats a down counting operation according to a clock signal CLOCK3 received from the clock pulse generating circuit 312. Then, in accordance with the lower three bits of the counter 10, a decoder 11 produces signals S1, S2, S3 and S4 one after another as shown in FIG. 3. A driving circuit (or the duty control circuit 201 of FIG. 1) which is arranged as shown in FIG. 4 then drives the stepping motor to rotate in a predetermined direction. The stepping motor is arranged, for example, as shown in FIG. 5. The duty control circuit 201 receives the signal S1 from the decoder 11. Further, the circuit 201 is arranged to receive signals DUTY1, DUTY0, CLOCK1, CLOCK2, CLOCK3 and PL as will be described later herein.

The basic operation of the duty control circuit 201 is to generate driving signals at the output terminals OUT-1-OUT4 thereof according to the timing of the signals S1-S4. The outputs (or driving signals) OUT1-OUT4 are supplied via the buffer amplifiers 202-205 to driving coils 206a, 206b, 206c and 206d which are arranged to serve as electric-to-magnetic converting means. By means of these coils, the rotor magnet 207 is either single-phase or two-phase driven.

When the motor is thus rotated to the initial position thereof, an initial position detecting switch 12 turns on. The level of the output 5 of the RS flip-flop 100 becomes a low level. An initial condition setting operation thus comes to an end.

The initial position detecting switch 12 is arranged to turn on only when all the lower three bits of the up-down counter 10 is at "0", that is, only when the output of the decoder 11 shown in FIG. 3 causes the level of the signal S3 (single phase) to solely become a high level. At this point of time, therefore, the up-down counter 10 has its lower three bits at "0" while the line of the above-stated output 5 is connected to an upper two bit reset input terminal thereof. Therefore, the upper two bits of the up-down counter 10 also become "0". Thus, all the outputs of the counter 10 become "0". Upon completion of the above-stated initial setting, a comparison circuit 200 compares a signal input A representing the target position of the aperture with an input B from the up-down counter 10. The comparison circuit 200 then produces the following discrimination signals as sppli-cable:

200C: indicating that two inputs are equal to each other.

200B: indicating that a difference between two inputs is more than 4.

200A: indicating that a difference between two inputs is more than 8.

200D: indicating that the output of the counter 10 is larger.

200E: indicating that the output of the counter 10 is smaller.

The up-down counter 10 is arranged to receive the outputs or signals 200D and 200E at the UP and DOWN input terminals thereof via gates 9 and 7. The counter 10, therefore, drives the stepping motor until the count output thereof comes to coincide with the target position signal. Further, an inverter 8 causes the counter 10 to perform only a down counting operation before completion of the initial condition setting operation.

The signal 200A is logically added together with the output of the flip-flop 100 through an OR gate 6 and, after that, is logically multiplied by the output of an inverter 13. As a result, the signal 200A is produced as a signal 200A' only when motion picture recording is not performed.

Figure 6:
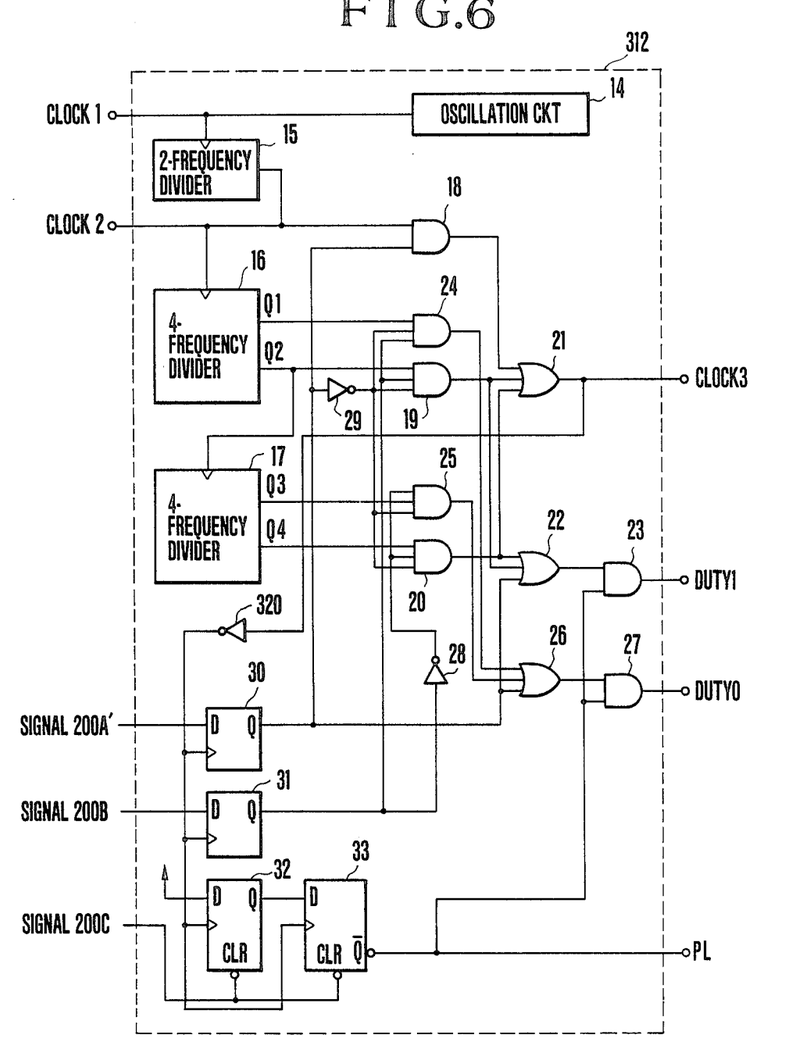
FIG. 6 is a diagram showing by way of example the arrangement of a clock pulse generator.

FIG. 6 shows by way of example the arrangement of the clock pulse generating circuit 312 which forms the above-stated clock signal CLOCK3 and varied kinds of other clock signals required for a smooth aperture adjusting operation according to this invention. Referring to FIG. 6, an oscillation circuit 14 is arranged to generate a clock signal CLOCK1 which is of a frequency a little lower than a frequency value two times as high as a limit to the single- or two-phase driving operation of the stepping motor. The signal CLOCK1 is divided into two frequencies by a frequency divider 15. The signal CLOCK1 thus becomes a clock signal CLOCK2 of a frequency f/2 which is a little lower than the above-stated limit. The signal CLOCK2 is then frequency divided at two 4-frequency dividers 16 and 17 into signals Q1, Q2, Q3 and Q4. The signals Q1-Q4 are of frequencies f/4, f/8, f/16 and f/32 respectively. A data selector consists of AND gates 18, 19 and 20, an OR gate 21 and inverters 28 and 29. The data selector produces, when the signal 200A' is at a high level, the signal CLOCK2 as a clock signal CLOCK3 which is obtained from the signals 200A' and 200B. When the signal 200A' is at a low level while the signal 200B is at a high level, the data selector produces a signal Q2 as a clock signal CLOCK3. When the signals 200A' and 200B are at low levels, the data selector produces a signal Q4 as the clock signal CLOCK3.

Accordingly, the clock signal CLOCK3 which comes to the counter 10 of FIG. 2 basically has one of the following different frequency values:

$f/2$ in case of $1A - B1 > 8$ $f/8$ in case of $8 > 1A - B1 > 4$ $f/32$ in case of $4 > 1A - B1$ This arrangement gradually slows down the diaphragm driving speed according as the counted value of the counter 10 comes closer to the target value of the aperture, so that hunting, etc. can be effectively prevented.

Meanwhile, a signal DUTY1 is formed by means of the AND gates 19, 20 and 23, and the OR gate 22 and the inverters 28 and 29. Another signal DUTY0 is formed by the AND gates 24, 25 and 27, the OR gate 26 and the inverters 28 and 29.

Figure 7:
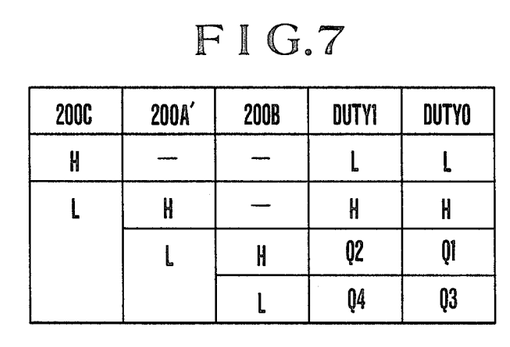
FIG. 7 is a chart showing the operation of the same.

Referring to FIG. 7, when the signal 200C is at a high level (hereinafter referred to as H), that is, in the case of A=B as shown in FIG. 2, the signals DUTY1 and DUTY2 are at a low level (hereinafter referred to as L). When the signal 200C is at L and the signal 200A' at H, that is, in the case of $1A - B1 > 8$, the signals DUTY1 and DUTY0 are at H respectively. Further, when the signal 200C is at L, the signal 200A' at L and the signal 200B at H, that is, in the case of $8 > 1A - B1 > 4$, there obtains a condition (DUTY1, DUTY0)=(Q2, Q1). When all the signals 200C, 200A' and 200B are at L, that is, in the case of $4 > 1A - B1$, there obtains a condition (DUTY1, DUTY0)=(Q4, Q3).

In this specific embodiment, the signals 200A' and 200B are arranged to be held at D flip-flops 30 and 31 until arrival of the next clock signal CLOCK3 respectively. This arrangement is made for the purpose of preventing the signals 200A' and 200B from changing during the process of the smooth aperture varying operation which is performed by duty control as will be described later.

The signal 200C is supplied from D flip-flops 32 and 33 via a timer to gates 23 and 27 and to an output terminal PL. The purpose of this is to prevent hunting from being brought about by any change of the duty that might arise immediately after the stepping motor comes to a stop with a target value having been reached.

Figure 8:
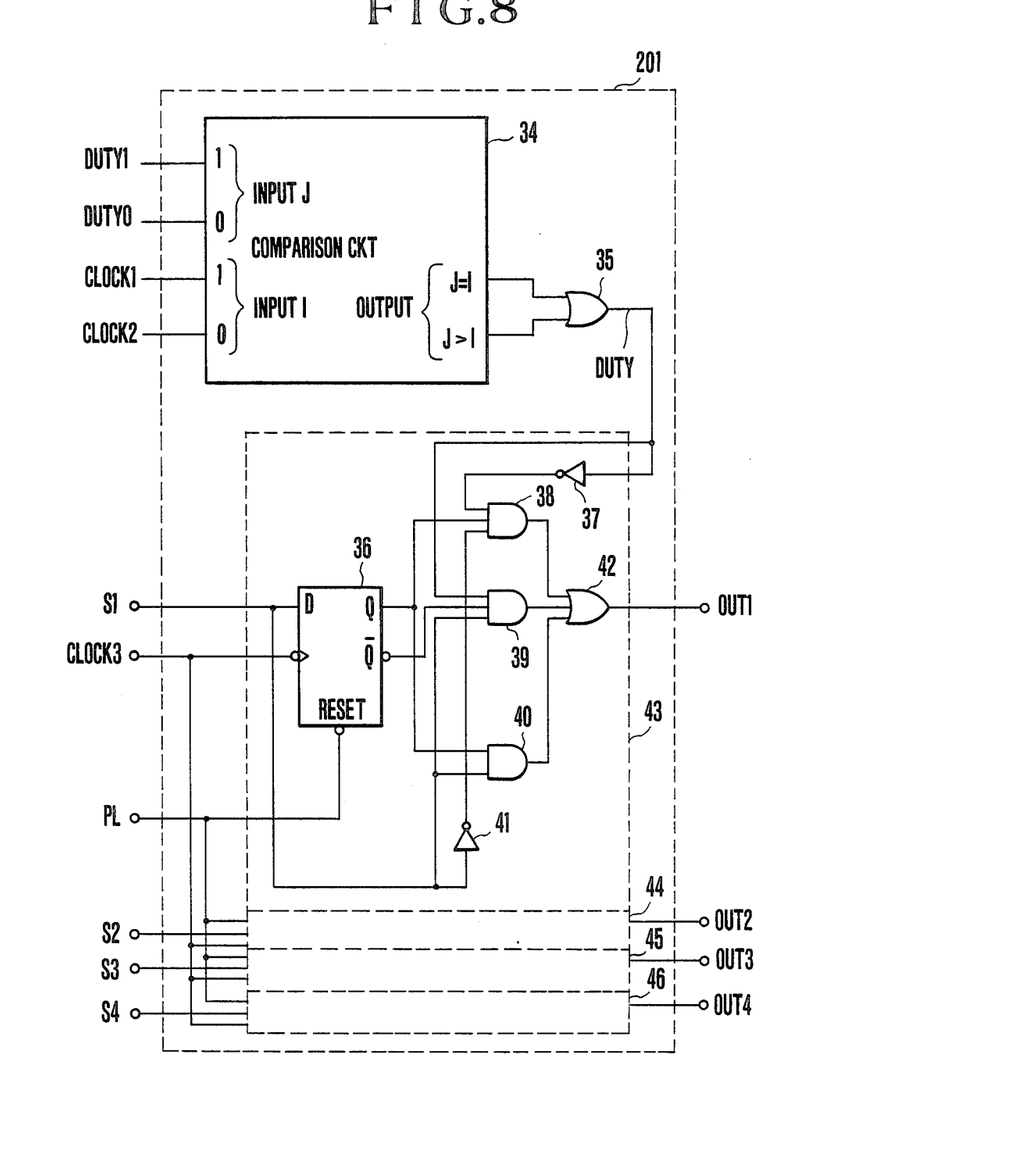
FIG. 8 is a diagram showing by way of example the arrangement of a duty control circuit.
Figure 9:
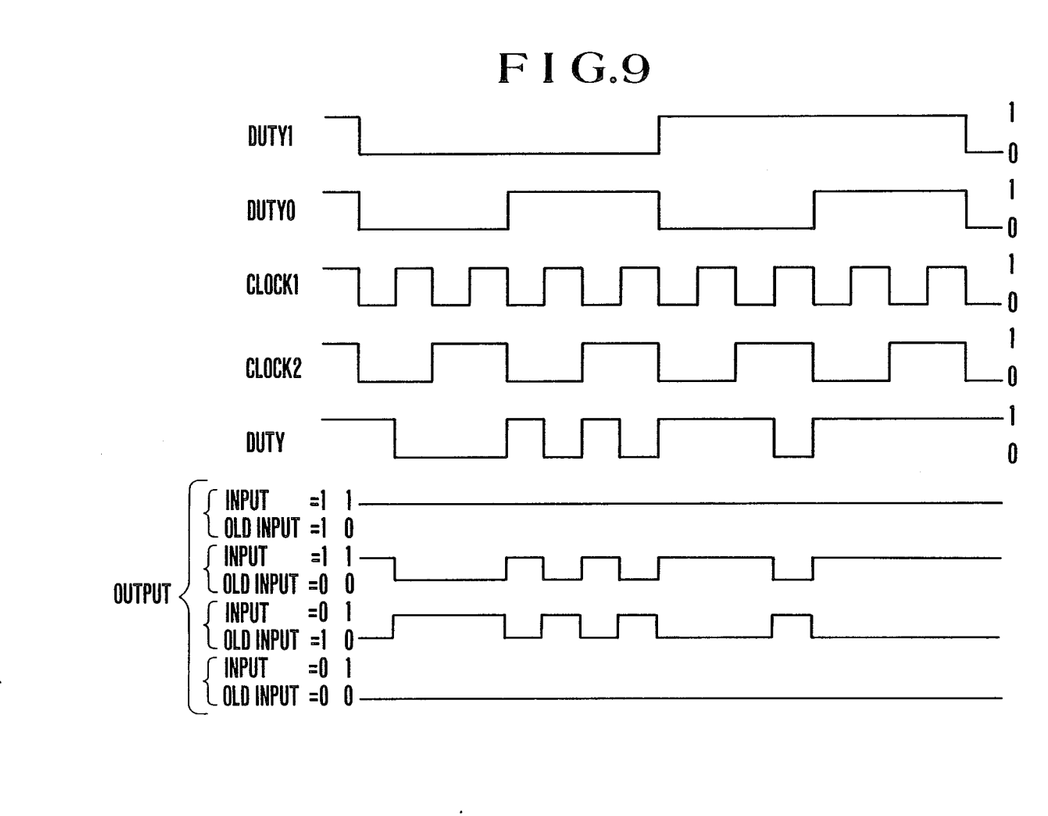
FIG. 9 is a timing chart showing the operation of the same.
Figure 10:
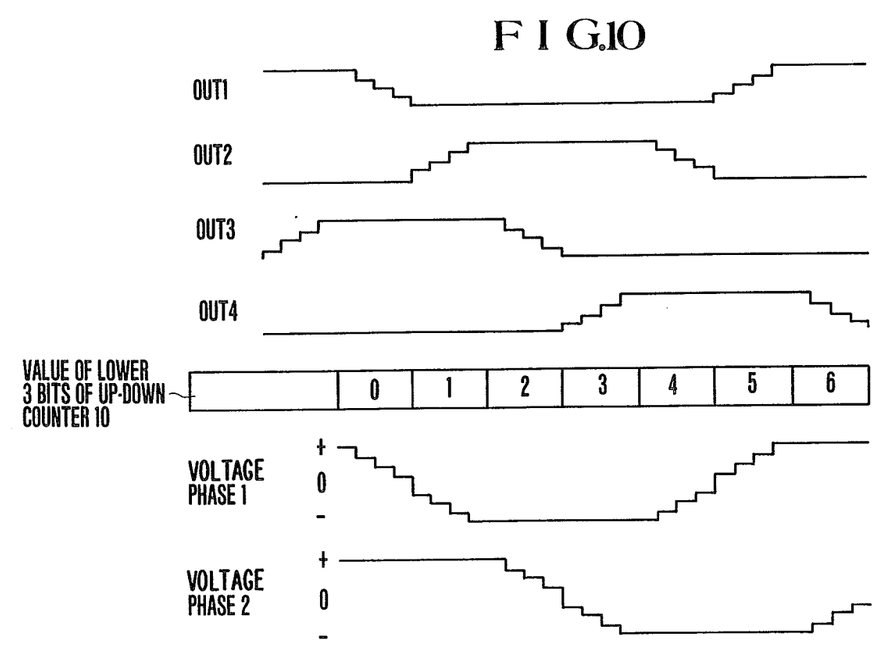
FIG. 10 is a chart showing voltage variations of each coil of the motor.

FIG. 8 shows by way of example the arrangement of the duty control circuit 201 shown in FIG. 4. FIG. 9 is a timing chart showing the operation thereof. FIG. 10 shows the voltage variations across each motor coil as a result of the effective currents in the outputs of FIG. 4. A comparison circuit 34 is arranged to compare its input J=(DUTY1 and DUTY0) and another input I=(-CLOCK1 and CLOCK2). In case of J=I or J>I, an H output is produced from an OR gate 35. There are provided selector circuits 43, 44, 45 and 46. These selector circuits are arranged in the same manner. Therefore, the circuit 43 is alone described herein. The duty control circuit 201 further includes a D flip-flop circuit 36; inverters 37 and 41; AND gates 38–40 and an OR gate 42.

The clock signal CLOCK3 causes the D flip-flop 36 to latch an input signal S1 and to have an old input stored there. The circuits 37, 38, 39, 40, 41 and 42 serve as logic gates, which are arranged to produce the following outputs:

(i) Always an H output when both new and old inputs are at H.

(ii) A signal of duty which increases from ¼ to 2/4, to ¾ and to 1 when the new input is at H while the old input is at L.

(iii) A signal of duty which decreases from 1 to ¾, to 2/4 and to ¼ when the new input is at L and the old input at H.

(iv) Always an L output when both the new and old outputs are at L.

The arrangement greatly smoothens the diaphragm driving operation to preclude any possibility of unpleasant effects of luminance adjustment operations on image sensing signals. Further, the old input is always at L when input signal PL is at L. In this instance, the signals DUTY0 and DUTY1 from the clock signal generating circuit 312 are both at L as mentioned in the foregoing. Therefore, an output OUT1 shown in FIG. 8 is at ¼ duty when the signal S1 is at H and is always at L when the signal S1 is at L. This gives an advantageous effect of saving electric energy because only a minimum necessary current is allowed to flow a short period after the diaphragm aperture reaches a target value.

FIG. 9 is a timing chart showing the operation of duty control circuit performed in case that the signal 200A' is at L, the signal 200B at H and the signal 200C at L, that is, in the case of 8>1A−B1>4. In this case, the diaphragm is smoothly driven at a relatively high speed. The operation of the above-stated clock pulse generating circuit 312 causes the signals DUTY1, DUTY0, CLOCK1 and CLOCK2 to have wave forms as shown in FIG. 9 in this instance. The comparison circuit 34 and the OR gate 35 then cause the duty of the output of the OR gate to vary in the order of ¼, 2/4, ¾ and 1. Further, for the purpose of reducing the low frequency component of the duty of the output of the OR gate 35, the signals CLOCK1 and CLOCK2 apply 2 bits in a reverse sequence to the input J in this specific embodiment.

The driving circuit is arranged, as mentioned in the foregoing, to supply the coils 206a–206d with the output of the above-stated duty control circuit 201 via the buffer amplifiers 202–205. As a result of the above, the effective voltage across each motor coil almost continuously varies as shown in FIG. 10, so that the stepping motor can be smoothly rotated. Therefore, the luminance level of the image sensing signal does not suddenly change to give no unnatural effect.

In accordance with the arrangement of this embodiment, when the motor comes to a stop at a desired position, power supply is reduced by decreasing the duty according to the signal 200C. This arrangement is, therefore, suited for a compact image sensing apparatus. It is especially a great advantage that the power consumption is reduced by the arrangement to perform single-phase driving in the initial stage.

Another advantage of the embodiment resides in that: With the exception of a motion picture recording mode, the diaphragm is driven as quick as possible in the event of any error in the aperture position thereof, so that a good recording chance can be seized without fail.

Further, in case that an error arises in the aperture position during a motion picture recording operation, the diaphragm is driven at a speed in proportion to the degree of the error or deviation, i.e. at a very high speed in the event of deviation to a large degree, smoothly at a relatively high speed in the event of deviation to a medium degree, or smoothly at a low speed in the event of deviation to a small degree, so that control can be appositely accomplished.

While the duty variations are divided into four steps in the case of this specific embodiment, the steps may be more finely divided. Further, it is possible to arrange the duty variations to be made on the basis of specific functions determined according to the characteristics of the stepping motor for more smoothness of the operation thereof.

Figure 11:
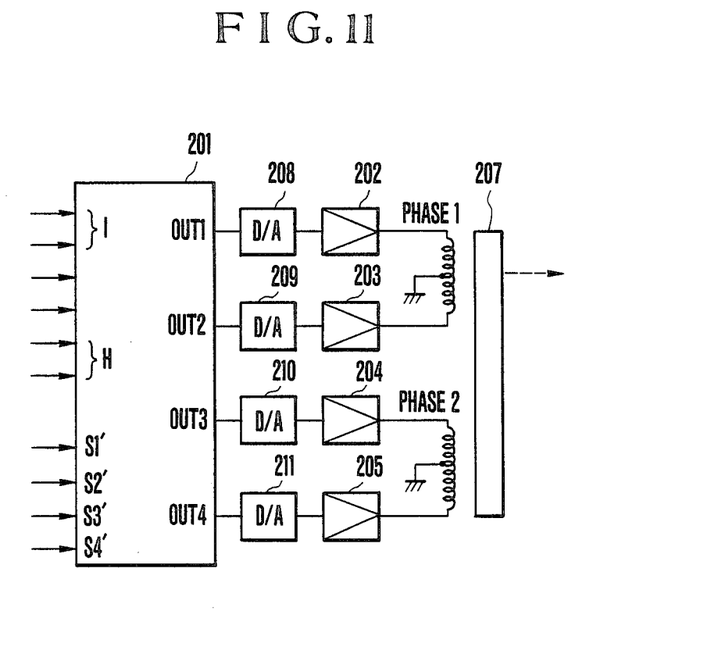
FIG. 11 is a diagram showing the essential parts of an image sensing apparatus arranged according to this invention as a second example of embodiment thereof.

FIG. 11 shows another embodiment of this invention in which the outputs of the duty control circuit 201 are arranged to be converted into analog signals. This example includes D/A (digital-to-analog) converters 208–211. In this case, instead of the duty, the amounts of currents to be applied to the stator coils of the stepping motor is adjusted to smoothen the driving operation of the stepping motor. The D/A converters 208–211 may be replaced either with integration circuits or current limiting resistors.

What is claimed is:

1. An image sensing apparatus comprising:
   (a) a stepping motor including a plurality of electric-to-magnetic converting means for driving said stepping motor;
   (b) control means arranged to control the effective level of an electric input supplied to each of said electric-to-magnetic converting means in a stepwise manner including at least three steps;
   (c) exposure control means arranged to be driven by said stepping motor; and
   (d) light receiving means arranged to have the quantity of light incident thereon limited by said exposure control means.

2. An apparatus according to claim 1, wherein said light receiving means includes photo-electric converting means.

3. An apparatus according to claim 2, wherein said photo-electric converting means includes image sensing means.

4. An apparatus according to claim 1, wherein said electric-to-magnetic converting means are coils.

5. An apparatus according to claim 1, wherein said electric input is a variable duty signal, said control means controls the duty of said electric input signal to control the effective level of said electric input signal.

6. An apparatus according to claim 1, wherein said control means varies the effective levels of said electric inputs according to whether said motor is in repose or being displaced.

7. An apparatus according to claim 1, wherein said control means almost continuously varies the levels of said electric inputs to said electric-to-magnetic converting means.

8. An image sensing apparatus according to claim 1, further comprising indication means for indicating the amount of dirve of said stepping motor, and wherein said controlling means has a first mode for driving the effective level of said electric input at a first level and a second mode for driving the effective level of said electric input at least one step at a second level which is lower than the first level.

9. An image sensing apparatus according to claim 1, further comprising means for selecting a still taking mode or a movie taking mode.

10. An image sensing apparatus according to claim 9, wherein said controlling means activates a first mode when said selecting means selects the still taking mode, and activates a second mode when said selecting means selects the movie taking mode.

11. An apparatus comprising:
 (a) displacement means;
 (b) electromagnetic means for causing a relative displacement of said displacement means;
 (d) control means arranged to variably control the effective level of said pulse signal in a stepwise manner including at least three steps;
 (e) image sensing means arranged to have the quantity of exposure light varied according to the displacement of said displacement means; and
 (f) selecting means for selecting the number of pictures to be taken by said sensing means.

12. A device according to claim 11, wherein said control means is arranged to control the effective level of said pulse signal according to the selection of said selecting means.

13. A device according to claim 12, wherein said control means increases the number of control steps of the effective level of said pulse signal as the number of pictures selected by said selecting means increases.

14. An image pick-up device comprising:
 (a) means for limiting radiation from an object;
 (b) electromagnetic means for operating said limiting means;
 (c) means for selecting a number of a picture to be picked up by said image pick-up device; and
 (d) means for supplying a signal to said electromagnetic means, wherein an effective level of said signal is variable in accordnace with the number of said selecting means.

15. An image pick-up device according to claim 14, wherein said electromagnetic means is a stepping motor.

16. An image pick-up device according to claim 15, wherein said selecting means is means for selecting a still picture picking up mode or a movie picture picking up mode.

17. An image pick-up device according to claim 14, wherein said limiting means is an iris.

18. An image pick-up device according to claim 14, wherein said limiting means is a shutter.

19. An image pick-up device according to claim 14, wherein said supplying means changes the duty of said signal to vary the effective level of said signal.

20. An apparatus comprising:
 (a) a stepping motor for moving a member;
 (b) means for detecting that said member reaches a prescribed position;
 (c) means for supplying a drive signal to said stepping motor; and
 (d) means for controlling said supplying means, which changes an effective level of the drive signal supplied from said supplying means by changing a duty of said drive signal in response to detection by said detecting means.

21. An apparatus according to claim 20, wherein said apparatus is an exposure control apparatus.

22. An apparatus according to claim 21, wherein said member is an exposure control member.

23. An apparatus according to claim 22, wherein said member is an iris member.

24. An apparatus according to claim 22, wherein said detecting means is at a position where said iris member reaches its maximum opening value.

* * * * *